(12) United States Patent
Noda et al.

(10) Patent No.: US 11,069,907 B2
(45) Date of Patent: Jul. 20, 2021

(54) FUEL CELL SYSTEM AND METHOD FOR CONTROLLING FUEL CELL SYSTEM

(71) Applicant: NISSAN MOTOR CO., LTD., Yokohama (JP)

(72) Inventors: Tetsushi Noda, Kanagawa (JP); Hayato Chikugo, Kanagawa (JP); Tatsuya Yaguchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/632,609

(22) PCT Filed: Aug. 1, 2017

(86) PCT No.: PCT/JP2017/027865
§ 371 (c)(1),
(2) Date: Jan. 21, 2020

(87) PCT Pub. No.: WO2019/026174
PCT Pub. Date: Feb. 7, 2019

(65) Prior Publication Data
US 2020/0212458 A1    Jul. 2, 2020

(51) Int. Cl.
*H01M 8/04014* (2016.01)
*H01M 8/04223* (2016.01)
*H01M 8/0432* (2016.01)
*H01M 8/0612* (2016.01)

(52) U.S. Cl.
CPC ... *H01M 8/04022* (2013.01); *H01M 8/04268* (2013.01); *H01M 8/04328* (2013.01); *H01M 8/04335* (2013.01); *H01M 8/04365* (2013.01); *H01M 8/0618* (2013.01)

(58) Field of Classification Search
CPC ........... H01M 8/0618; H01M 8/04753; H01M 8/04776; H01M 8/04373; H01M 8/04302; H01M 8/04225
See application file for complete search history.

(56) References Cited

U.S. PATENT DOCUMENTS

| 2008/0118800 A1 | 5/2008 | Devriendt et al. |
| 2014/0038071 A1* | 2/2014 | Ogawa ............. H01M 8/04373 429/425 |
| 2015/0147669 A1 | 5/2015 | Yoshimine |

FOREIGN PATENT DOCUMENTS

| JP | 2007-66551 A | 3/2007 |
| JP | 2009-277621 A | 11/2009 |
| JP | 2010-508633 A | 3/2010 |
| JP | 2012-221933 A | 11/2012 |
| JP | 2012-227065 A | 11/2012 |
| JP | 2013-258026 A | 12/2013 |
| JP | 2016-154067 A | 8/2016 |
| WO | WO 2017/098787 A1 | 6/2017 |

* cited by examiner

*Primary Examiner* — Ladan Mohaddes
(74) *Attorney, Agent, or Firm* — Foley & Lardner LLP

(57) ABSTRACT

A fuel cell system includes: a fuel cell; a fuel treating unit configured to treat a raw fuel and generate fuel gas for the fuel cell; an oxidant-gas heater configured to heat oxidant gas for the fuel cell; a combustor configured to combust the raw fuel and generate combustion gas to heat the fuel treating unit and the oxidant-gas heater; and a control unit configured to control supplying of the raw fuel to the fuel treating unit and the combustor at the time of warming-up of the fuel cell. The control unit supplies the raw fuel to both of the fuel treating unit and the combustor when the fuel treating unit is at an operable temperature of the fuel treating unit.

6 Claims, 7 Drawing Sheets

FUEL CELL SYSTEM AND METHOD FOR CONTROLLING FUEL CELL SYSTEM

TECHNICAL FIELD

The present invention relates to a fuel cell system including a combustor for warming-up of a fuel cell, and a control method for the fuel cell system.

BACKGROUND ART

JP2016-154067 discloses a fuel cell system including a starting combustor and a reformer, and the fuel cell system is configured to change the supplying target of raw fuel between the starting combustor and the reformer at the time of start-up of the fuel cell system. Specifically the fuel cell system includes a first fuel supplying channel to supply raw fuel before reforming to the starting combustor and a second fuel supplying channel to supply raw fuel to the reformer. When the temperature of the reformer does not reach a reformable temperature, the system supplies raw fuel to the starting combustor via the first fuel supplying channel. After the temperature of the reformer reaches the reformable temperature, the system supplies raw fuel to the reformer via the second fuel supplying channel (paragraphs 0032 and 0033).

SUMMARY OF INVENTION

A system including fuel cells having a high operating temperature, such as a solid-oxide fuel cell, needs a large amount of heat for warming-up of the fuel cells at the time of startup. When a fuel cell system depends on the combustor to generate such an amount of heat, the required amount of fuel has to be supplied to the combustor. Simply supplying of the fuel to the combustor to give the amount of heat generated from the combustion to the fuel cells will fail to suppress the fuel consumption correctly, and so will fail to configure the effective system.

JP2016-154067 discloses the system including the starting combustor as well as the reformer, and the system selects any one of the starting combustor and the reformer as the heat source for warming up. The system therefore has to be designed so that the reformer as well as the starting combustor has the flow rate of the fuel for startup to obtain a sufficient amount of heat from the increased flow rate of the fuel. This means that special design is required for startup, which adversely affects the efficiency of the entire system.

The present invention provides fuel cell systems and control methods for the fuel cell system to solve the above problem.

A fuel cell system according to one embodiment of the present invention is a fuel cell system comprising a fuel cell, a fuel treating unit configured to treat raw fuel and generate fuel gas for the fuel cell, an oxidant-gas heater configured to heat oxidant gas for the fuel cell, a combustor configured to combust the raw fuel and generate combustion gas to heat the fuel treating unit and the oxidant-gas heater, and a control unit configured to control supplying of the raw fuel to the fuel treating unit and the combustor at the time of warming-up of the fuel cell, the control unit supplying the raw fuel to both of the fuel treating unit and the combustor when the fuel treating unit is at an operable temperature of the fuel treating unit.

DESCRIPTION OF EMBODIMENTS

The following describes one embodiment of the present invention, with reference to the attached drawings.

(Overall Configuration of Fuel Cell System)

Figure 1:
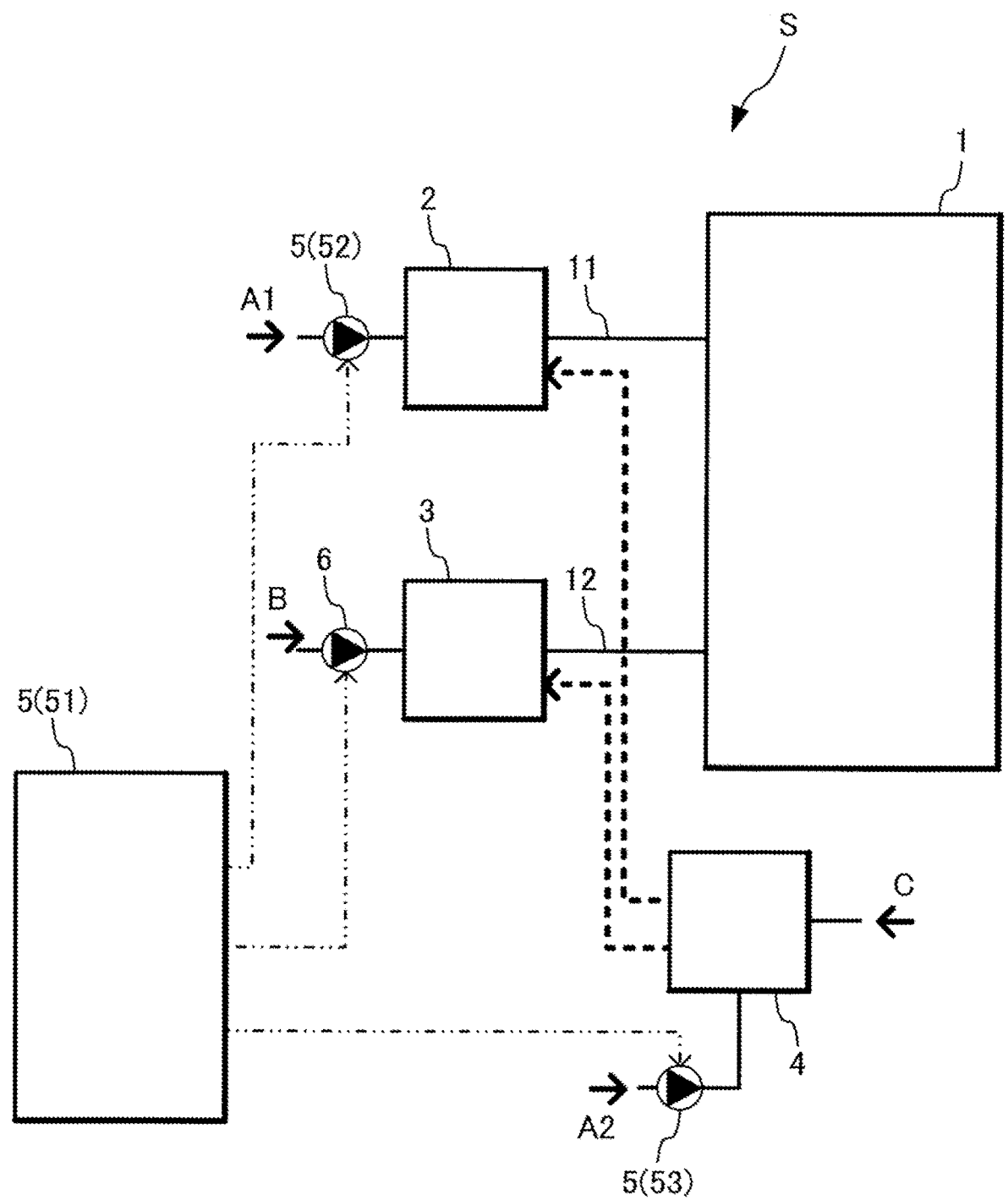
FIG. 1 schematically shows the configuration of a fuel cell system according to one embodiment of the present invention.

FIG. 1 schematically shows the configuration of a fuel cell system S according to one embodiment of the present invention.

The fuel cell system (hereinafter this may be called a "fuel cell system" or simply a "system") S according to the present embodiment includes a fuel cell stack 1, a fuel treating unit 2, an oxidant-gas heater 3, a combustor 4, and a control unit 5.

The fuel cell stack (hereinafter this may be called simply a "stack") 1 includes the lamination of a plurality of fuel cells or fuel cell unit cells. The fuel cells as the source of generating power are solid-oxide fuel cells (SOFC), for example. In the fuel cell stack 1, the anode side includes: an anode-gas flow path 11 to supply fuel gas to the anode of the fuel cell; and an anode off-gas flow path 11exh (not shown in FIG. 1) for the anode off-gas emitted from the anode after the power-generation reaction. The cathode side includes a cathode-gas flow path 12 to supply oxidant gas to the cathode of the fuel cell; and a cathode off-gas flow path 12exh (not shown) for the cathode off-gas emitted from the cathode after the power-generation reaction.

The fuel treating unit 2 treats raw fuel as primary fuel to convert the raw fuel into fuel gas used for the power-generation reaction at the fuel cell. The fuel treating unit 2 is disposed on the anode-gas flow path 11 to receive the supplied raw fuel (arrow A1).

The oxidant-gas heater 3 heats oxidant gas. The oxidant-gas heater 3 is disposed on the cathode-gas flow path 12 to receive the supplied oxidant gas (arrow B). The oxidant gas is air, for example. To this end, ambient air can be supplied to the cathode of the fuel cell to supply oxygen for the power-generation reaction to the cathode. The system includes an air suction unit 6 to suck oxidant gas or air from the atmosphere into the cathode-gas flow path 12, and the air suction unit 6 may be an air compressor or a blower disposed close to the opening end of the cathode-gas flow path 12, for example.

The power-generation reaction at the anode and the cathode of the solid-oxide fuel cell can be represented by the following formulae:

$$\text{Anode: } 2H_2 + 4O^{2-} \rightarrow 2H_2O + 4e^- \quad (1.1); \text{ and}$$

$$\text{Cathode: } O_2 + 4e^- \rightarrow 2O^{2-} \quad (1.2).$$

The combustor 4 combusts the raw fuel of the fuel cell to generate combustion gas. The combustor 4 receives the supplied raw fuel (arrow A2) and receives the supplied oxidant for the raw fuel (arrow C). The amount of heat that the combustion gas has is supplied to the fuel treating unit 2 and the oxidant-gas heater 3 to heat the raw fuel and the oxidant gas. Thick dashed lines in FIG. 1 indicate the transfer of the amount of heat from the combustor 4 to the fuel treating unit 2 and the oxidant-gas heater 3.

The control unit 5 controls the supplying of raw fuel to the fuel treating unit 2 and the combustor 4, and can be configured to include an electronic control unit for this purpose. The control unit 5 in the present embodiment includes a controller 51 configured as an electronic control unit, a main fuel-supplying unit 52 to supply raw fuel to the fuel treating unit 2, and a sub fuel-supplying unit 53 to supply raw fuel to the combustor 4. Both of these fuel-supplying units 52 and 53 may be injectors. The present embodiment includes a first fuel injector as the main fuel-supplying unit 52 and a second fuel injector as the sub fuel-supplying unit 53. These first fuel injector 52 and second fuel injector 53 operate in accordance with an instruction signal from the controller 51 so as to supply raw fuel to the fuel treating unit 2 and the combustor 4, respectively, continuously or intermittently.

At the time of startup of the fuel cell system S, the controller 51 determines whether the fuel treating unit 2 is ready for the treatment of raw fuel or not. This determination can be made based on the temperature of the fuel cell stack S, for example. When the fuel treating unit 2 is ready for treatment of the raw fuel, the control unit 51 controls to supply raw fuel to the fuel treating unit 2 via the first fuel injector 52 and to supply raw fuel to the combustor 4 via the second fuel injector 53. With this configuration, the fuel cell system heats the raw fuel at the fuel treating unit 2 with the combustion gas generated at the combustor 4 as the heat source to promote the treatment of the raw fuel, and heats the oxidant gas at the oxidant-gas heater 3 to promote the warming-up of the fuel cell stack 1.

Figure 2:
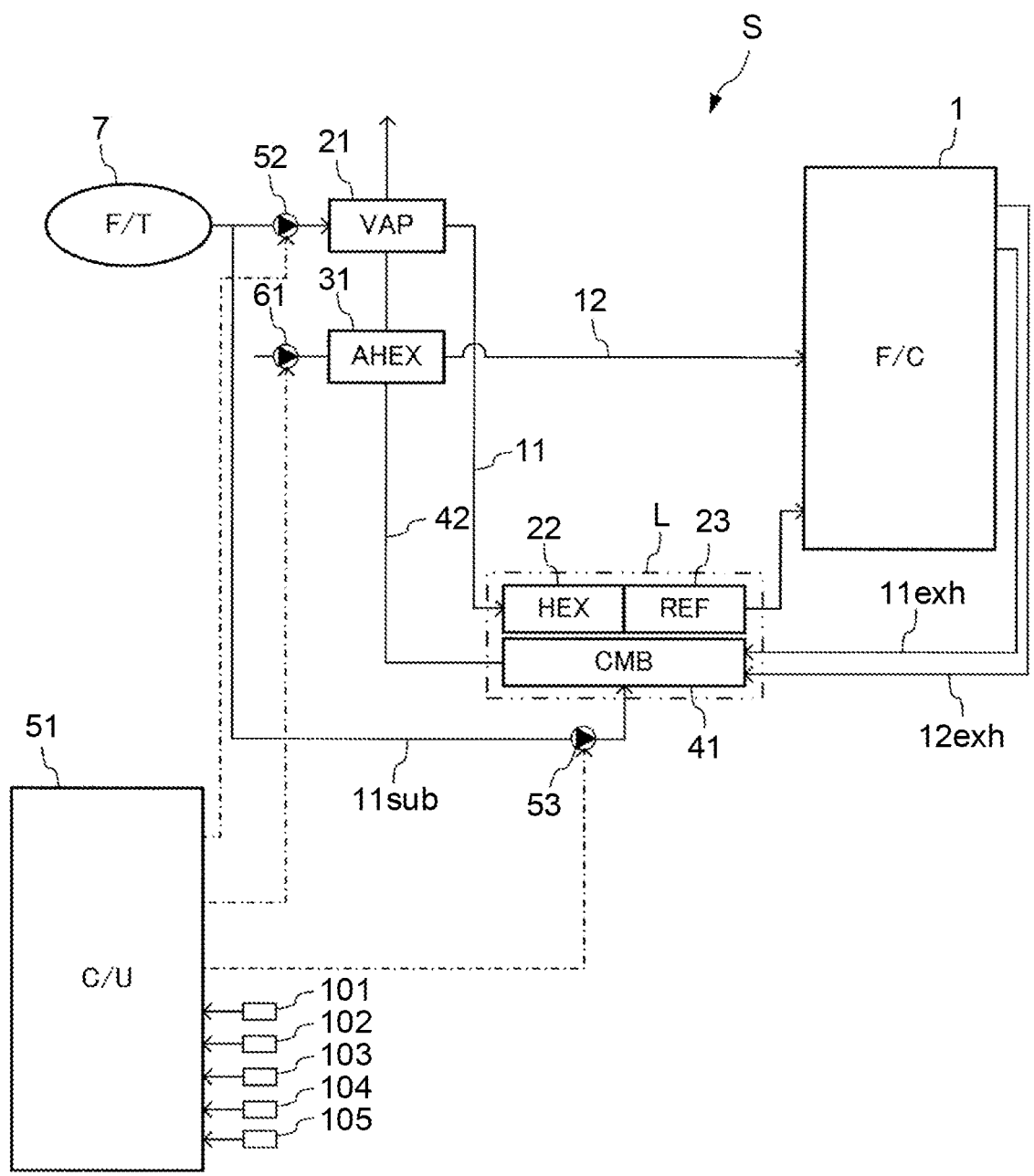
FIG. 2 shows the configuration of the fuel cell system according to this embodiment in more details.

FIG. 2 shows the configuration of the fuel cell system S in more details.

The fuel cell system S includes a solid-oxide fuel cell (SOFC) as the power-generation source, and includes a fuel tank 7 that is mountable on a vehicle. In this embodiment, raw fuel as the primary fuel is the mixture of oxygenated fuel (e.g., ethanol) and water, and is stored in the fuel tank 7. The fuel tank 7 and the fuel cell stack 1 connect via the anode-gas flow path 11. An evaporator 21, a fuel heat exchanger 22 and a reformer 23 are disposed in this order from the upstream of the gas-flowing direction of the anode-gas flow path 11. A branch fuel flow path 11 sub branches off from the anode-gas flow path 11 upstream of the evaporator 21, and the branch fuel flow path 11 sub connects to the combustor 41. The first fuel injector 52 is disposed between the branching point of the branch fuel flow path 11sub and the evaporator 21 on the anode-gas flow path 11, and the second fuel injector 53 is disposed on the branch fuel flow path 11sub. This enables switching of the flowing of raw fuel between the anode-gas flow path 11 and the branch fuel flow path 11sub, and enables the flowing of raw fuel through both of these flow paths 11 and 11sub. The evaporator 21, the fuel heat exchanger 22 and the reformer 23 make up a "fuel treating unit" of the present embodiment.

The evaporator 21 receives ethanol aqueous solution as the raw fuel from the fuel tank 7, and heats the ethanol aqueous solution to evaporate both of liquid ethanol and water and generate ethanol gas and water vapor.

As described later, the fuel heat exchanger 22 receives the amount of heat that the combustion gas has from the combustor 41 to heat ethanol gas and water vapor.

The reformer 23 internally contains reforming catalyst to generate hydrogen from ethanol gas by steam reforming. The steam reforming can be represented by the following formula. The steam reforming is endothermic reaction, and so requires the amount of heat supplied from the outside for reforming. As described later, the present embodiment is configured so that the combustor 41 combusts the fuel remaining in anode off-gas during reforming as well, and the amount of heat of the combustion gas is supplied to the reformer 23. Fuel gas of the fuel cell in the present embodiment is the mixture gas of carbon dioxide and hydrogen generated by reforming ethanol.

$$C_2H_5OH+3H_2O \rightarrow 6H_2+2CO_2 \qquad (2)$$

The oxidant-gas heater 3 includes an air heat exchanger 31, and heats oxidant gas flowing through the cathode-gas flow path 12 by heat exchanging with the combustion gas supplied from the combustor 41 via a combustion-gas flow path 42. The present embodiment includes the air compressor 61 close to the opening end of the cathode-gas flow path 12 to suck ambient air as the oxidant gas into the cathode-gas flow path 12 via the air compressor 61. The sucked air at room temperature (e.g., 25° C.) increases in temperature during the passage through the air heat exchanger 31 and then is supplied to the fuel cell stack 1.

The combustor 41 internally contains combustion catalyst, and receives ethanol aqueous solution as the raw fuel via the branch fuel flow path 11sub and generates combustion gas through catalytic combustion of ethanol. The present embodiment connects the combustor 41 and the evaporator 21 via the combustion-gas flow path 42, and heats the shell and the case of the evaporator 21 with the combustion gas. The fuel heat exchanger 22 and the reformer 23 are accommodated in a case (indicated with the dashed-two dotted line L) shared with the combustor 41 so that the amount of heat of the combustion gas is transmitted to the fuel heat exchanger 22 and the reformer 23 inside of this shared case L.

The combustor 41 in the present embodiment connects to both of the anode off-gas flow path 11exh and the cathode off-gas flow path 12exh extending from the fuel cell stack 1, so that the combustor 41 can receive oxidant gas via the cathode off-gas flow path 12exh at the time of startup of the fuel cell system S. To reform the raw fuel, the combustor 41 receives anode-off gas and cathode-off gas and generates a reaction of the remaining fuel (ethanol) in the anode-off gas and oxygen remaining in the cathode-off gas over the catalyst to generate an amount of heat to heat the evaporator 21, the fuel heat exchanger 22 and the reformer 23.

The electricity generated at the fuel cell stack 1 can be used for charging of a battery or for driving an external device, such as an electric motor or a motor generator. In one example, the fuel cell system S may be used for a vehicle driving system so that electricity generated by rated operation of the fuel cell stack 1 is charged into a battery, and the electricity according to the target driving force of the vehicle is supplied from the battery to a motor generator for travelling.

(Configuration of Control System)

The controller 51 controls various units and components used for the operation of the fuel cell system S, including the first fuel injector 52, the second fuel injector 53, and the air compressor 61. The controller 51 in the present embodiment is configured as an electronic control unit including a microcomputer made up of a central processing unit, various types of memories, such as ROM and RAM, an input/output interface, and the like.

For the normal operation (hereinafter this may be simply referred to as "during normal"), the controller 51 sets the supplying flow rate of the raw fuel required for the rated operation of the fuel cell stack 1 (hereinafter this supplying flow rate will be called a "normal supplying flow rate"), and supplies the raw fuel of the normal supplying flow rate to the fuel cell system S via the first fuel injector 52. "During normal" refers to the operation after the completion of warming-up of the fuel cell stack 1, and the rated operation of the fuel cell stack 1 refers to the operation of the fuel cell stack 1 at the maximum power-generation output.

Receiving a startup request of the fuel cell system S from a startup switch 105, the controller 51 executes the startup control to warm up the fuel cell stack 1. Warming-up of the fuel cell stack 1 refers to a temperature rise of the fuel cell stack 1, which is at a low temperature during stopping (e.g., at a room temperature), to the operating temperature. The operating temperature of the solid-oxide fuel cell is about 800 to 1000° C., and the startup control increases the temperature of the fuel cell stack 1 and the fuel cells to 600 to 700° C.

The controller 51 receives, as information on the startup control, various signals including a signal from a stack temperature sensor 101 to detect the stack temperature $T_{stk}$, a signal from an air flow-rate sensor 102 to detect the air flow rate $m_{air}$, a signal from an evaporator temperature sensor 103 to detect the evaporator temperature $T_{vap}$, and a signal from a reformer temperature sensor 104 to detect the reformer temperature $T_{ref}$.

The stack temperature $T_{stk}$ is an index indicating the temperature of the fuel cell stack 1 or the fuel cells. The present embodiment includes the stack temperature sensor 101 near the outlet of the cathode off-gas of the fuel cell stack 1, and sets the temperature detected by the stack temperature sensor 101 as the stack temperature $T_{stk}$.

The air flow rate $m_{air}$ is the flow rate of oxidant gas supplied to the fuel cell stack 1. The present embodiment includes the air flow rate sensor 102 on the cathode-gas flow path 12, specifically between the air compressor 61 and the air heat exchanger 31, and sets the flow rate detected by the air flow rate sensor 102 as the air flow rate $m_{air}$.

The evaporator temperature $T_{vap}$ is the temperature of the evaporator 21. The present embodiment includes the evaporator temperature sensor 103 on the combustion-gas flow path 42 downstream of the evaporator 21, and sets the temperature detected by the evaporator temperature sensor 103, i.e., the temperature of the combustion gas after heating of the evaporator 21 as the combustor temperature $T_{vap}$.

The reformer temperature $T_{ref}$ is the temperature of the reformer 23. The present embodiment includes the reformer temperature sensor 104 on the anode-gas flow path 11 downstream of the reformer 23, and sets the temperature detected by the reformer temperature sensor 104, i.e., the temperature of the fuel gas generated by reforming as the temperature $T_{ref}$.

Referring now to the flowchart, the startup control of the fuel cell system S is described below in more details.

(Startup Control)

Figure 3:
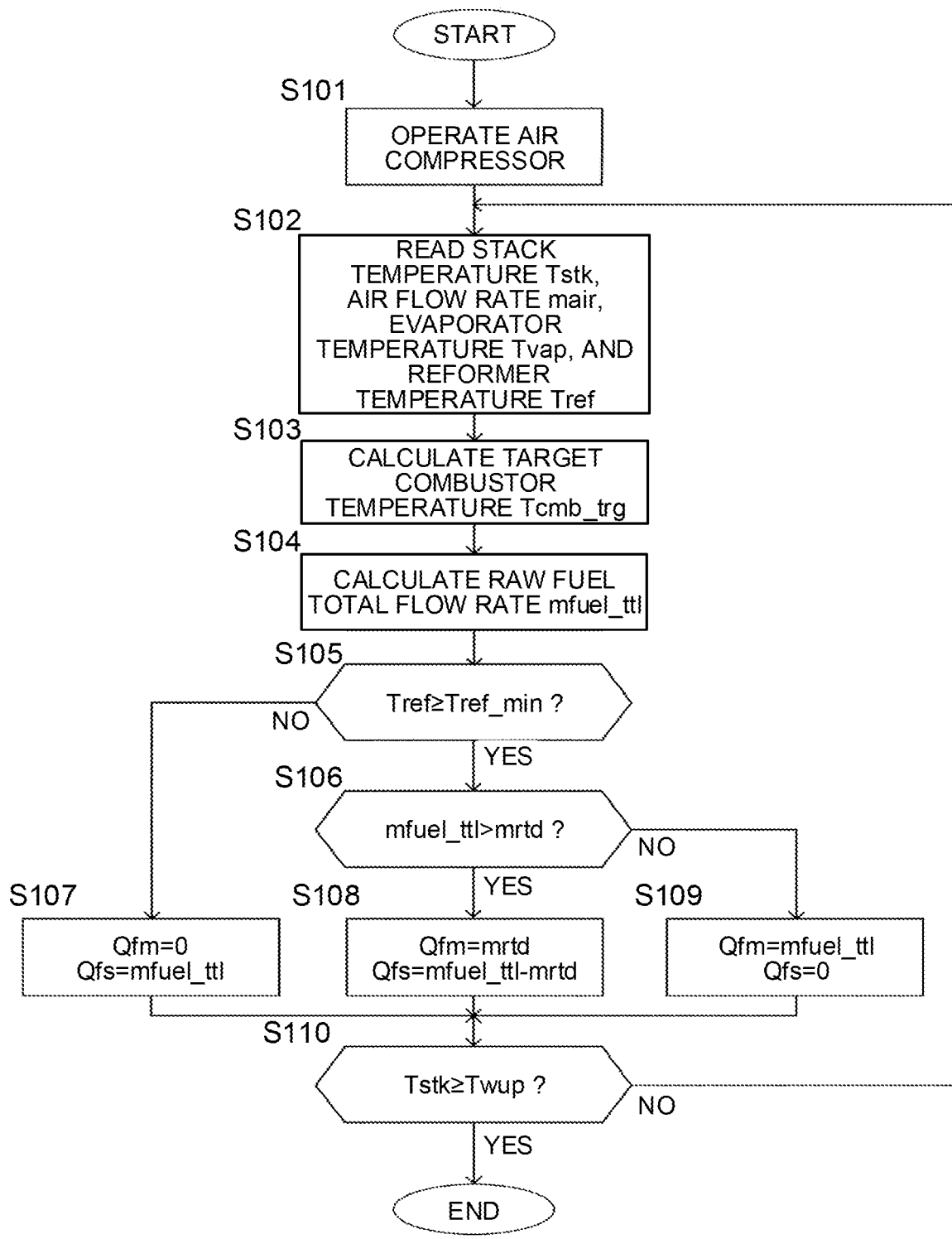
FIG. 3 is a flowchart showing the procedure of the startup control of the fuel cell system according to this embodiment.

FIG. 3 is a flowchart showing the procedure of the startup control of the fuel cell system S according to the present embodiment.

In response to the driver's operation of the startup switch 105, the controller 51 receives a startup request signal from the startup switch 105. Then the controller 51 executes the startup control of the fuel cell system S in accordance with the flowchart of FIG. 3. In the present embodiment, the controller 51 starts the startup control in response to the receiving of the startup request signal, and ends the startup control in response to a determination that the warming up of the fuel cell stack 1 or the fuel cells finishes.

At S101, the controller 51 starts to operate the air compressor 61. This step sucks the ambient air into the cathode-gas flow path 12, and supplies the air to the cathode of the fuel cell stack 1 via the air heat exchanger 31.

At S102, the controller 51 reads, as information on the startup control, the stack temperature $T_{stk}$, the air flow rate $m_{air}$, the evaporator temperature $T_{vap}$ and the reformer temperature $T_{ref}$.

At S103, the controller 51 calculates a target temperature for the combustor 41 (hereinafter called a "target combustor temperature") $T_{cmb\_trg}$. The target combustor temperature $T_{cmb\_trg}$ is a target temperature of the combustion gas generated at the combustor 41. The present embodiment calculates this target temperature based on the actual temperature of the fuel cell stack 1. Specifically the present embodiment calculates the target temperature for combustion gas, which gives the highest temperature of the oxidant gas that is allowed to flow into the fuel cell stack 1, by the following expression, i.e., by adding the temperature differences $\Delta T_{stk}$ and $\Delta T_{ahx}$ to the stack temperature $T_{stk}$ that is the temperature around the outlet of the cathode off-gas of the fuel cell stack 1. The temperature difference $\Delta T_{stk}$ is a temperature difference between the inlet of the oxidant gas and the outlet of the cathode off-gas of the fuel cell stack 1, and $\Delta T_{ahx}$ is a temperature difference between the inlet of the combustion gas and the outlet of the oxidant gas of the air heat exchanger 31. The temperature difference $\Delta T_{stk}$ is a temperature difference (e.g., 300° C.) that is allowed from the viewpoint of thermal load applied to the fuel cell, and the temperature difference $\Delta T_{ahx}$ is a temperature difference (e.g., 150° C.) that is given at the air heat exchanger 31 during the rated operation of the fuel cell stack 1.

$$T_{cmb\_trg}=T_{stk}+\Delta T_{stk}+\Delta T_{ahx} \quad (3)$$

At S104, the controller 51 calculates the flow rate of raw fuel to be supplied to the entire system (hereinafter this flow rate will be called a "raw-fuel total flow rate") $m_{fuel\_ttl}$ to warm up the fuel cell stack 1. In the present embodiment, the raw-fuel total flow rate $m_{fuel\_ttl}$ is a value in the molar ratio, and the value can be calculated by the following expressions. These expressions represent the balanced amount of transferred heat between the raw fuel and the oxidant gas supplied to the combustor 41 and the combustion gas discharged from the combustor 41.

$$m_{fuel\_ttl}=A/B \quad (4.1)$$

$$A=m_{air}\times\{h_{air}(T_{cmb})-h_{air}(T_{stk})\}-Q_{rec} \quad (4.2)$$

$$B=(1/5)\times h_{c2h5oh}(T_{fuel})+(4/5)\times h_{h2o\_l}(T_{fuel})-(2/5)\times h_{co2}(T_{cmb})-(7/5)\times h_{h2o}(T_{cmb})+(3/5)\times h_{o2}(T_{cmb}) \quad (4.3)$$

The raw fuel is ethanol aqueous solution, and the mixture ratio of ethanol and water in the ethanol aqueous solution is 1:4 in the molar ratio. The temperature of the raw fuel is 25° C. ($T_{fuel}$=25).

Variables in these expressions (4.1) to (4.3) are as follows.

$m_{fuel\_ttl}$: the total molar flow rate of the raw fuel at the time of warming-up of the fuel cell stack $m_{air}$: the molar flow rate of air $Q_{rec}$: the amount of exhaust heat recovery when the raw fuel at the rated flow rate is supplied to the fuel cell stack $T_{stk}$: the temperature of the fuel cell stack $T_{cmb}$: the temperature of the combustor $T_{fuel}$: the temperature of the raw fuel $h_{air}(T)$: enthalpy of air $h_{c2h5oh}(T)$: enthalpy of ethanol
$h_{h2o\_l}(T)$: enthalpy of water (liquid)
$h_{co2}(T)$: enthalpy of carbon dioxide
$h_{h2o}(T)$: enthalpy of water (gas)
$h_{o2}(T)$: enthalpy of oxygen
T denotes any temperature.

The present embodiment assigns the stack temperature $T_{stk}$ detected by the stack temperature sensor 101 for temperature $T_{stk}$, assigns the target combustor temperature $T_{cmb\_trg}$ for temperature $T_{cmb}$, and assigns 25° C. as a room temperature for temperature $T_{fuel}$. The rated flow rate refers to the flow rate of fuel required for the operation at the maximum power-generation output from the fuel cell stack 1.

The amount of exhaust heat recovery $Q_{rec}$ can be a certain value set beforehand. Note here that as described later, when an increase of the temperature $T_{stk}$ of the fuel cell stack 1 decreases the raw-fuel total flow rate $m_{fuel\_ttl}$, the amount of exhaust heat recovery $Q_{rec}$ also accordingly decreases. When the raw-fuel total flow rate $m_{fuel\_ttl}$ is less than the rated flow rate $m_{rtd}$, the amount of exhaust heat recovery $Q_{rec}$ is preferably decreased by the decrease amount relative to the rated flow rate $m_{rtd}$.

The maximum value $T_{cmb\_max}$ of the temperature $T_{cmb}$ of the combustor is limited to the upper-limit temperature of the fuel cell stack 1 (hereinafter called a "stack upper-limit temperature"). For instance, let that the stack upper-limit temperature is 800° C. When the target combustor temperature $T_{cmb\_trg}$ is 800° C. or less, then the target combustor temperature $T_{cmb\_trg}$ is assigned as the temperature $T_{cmb}$. When the target combustor temperature $T_{cmb\_trg}$ exceeds 800° C., then the stack upper-limit temperature, i.e., 800° C. is assigned as the temperature $T_{cm}b$. This avoids a temperature rise of the fuel cell stack 1 above the stack upper-limit temperature.

At S105, the controller 51 determines whether the reformer 23 is ready for reforming of the raw fuel or not. Specifically the controller 51 determines whether the reformer temperature $T_{ref}$ is a lower-limit temperature (hereinafter called a "reformer lower-limit temperature") $T_{ref\_min}$ or higher or not. At this lower-limit temperature $T_{ref\_min}$, the reformer 23 is ready for reforming. When the reformer temperature $T_{ref}$ is the reformer lower-limit temperature $T_{ref\_min}$ or higher, the procedure shifts to S106. When the reformer temperature $T_{ref}$ is less than the reformer lower-limit temperature $T_{ref\_min}$, the procedure shifts to S107. The reformer lower-limit temperature $T_{ref\_min}$ is 700° C., for example.

At S106, the controller 51 determines whether the raw-fuel total flow rate $m_{fuel\_ttl}$ is the rated flow rate $m_{rtd}$ of the fuel cell stack 1 or more or not. When the raw-fuel total flow rate $m_{fuel\_ttl}$ is larger than the rated flow rate $m_{rtd}$, the procedure shifts to S108. When the raw-fuel total flow rate $m_{fuel\_ttl}$ is the rated flow rate $m_{rtd}$ or less, the procedure shifts to S109.

At S107, the controller 51 determines that the reformer 23 is not ready for reforming of raw fuel, and stops the first fuel injector 52. Then the controller 51 controls to supply the raw fuel of the raw-fuel total flow rate $m_{fuel\_ttl}$ to the combustor 41 via the second fuel injector 53. The raw-fuel injection amount Qfm of the first fuel injector 52 and the raw-fuel injection amount Qfs of the second fuel injector 53 are as follows.

$$Qfm=0 \quad (5.1)$$

$$Qfs=m_{fuel\_ttl} \quad (5.2)$$

At S108 and S109, the controller 51 determines that the reformer 23 is ready for reforming of the raw fuel, and controls to supply raw fuel to the reformer 23.

At S108, the controller 51 starts to operate the first fuel injector 52 and the second fuel injector 53 to supply raw fuel to both of the reformer 23 and the combustor 41. Specifically the raw fuel of the rated flow rate $m_{rtd}$ is supplied to the evaporator 21 and to the fuel heat exchanger 22 and the reformer 23 downstream of the evaporator 21 via the first fuel injector 52, and the raw fuel corresponding to the shortage of the rated flow rate $m_{rtd}$ relative to the raw-fuel total flow rate $m_{fuel\_ttl}$ is supplied to the combustor 41 via the second fuel injector 53. The raw-fuel injection amounts Qfm and Qfs of the first fuel injector 52 and the second fuel injector 53 are as follows.

$$Qfm=m_{rtd} \quad (6.1)$$

$$Qfs=m_{fuel\_ttl}-m_{rtd} \quad (6.2)$$

At S109, the controller 51 stops the second fuel injector 53, and supplies the raw fuel of the raw-fuel total flow rate $m_{fuel\_ttl}$ to the evaporator 21, the fuel heat exchanger 22 and the reformer 23 via the first fuel injector 52. The raw-fuel injection amounts Qfm and Qfs of the first fuel injector 52 and the second fuel injector 53 are as follows.

$$Qfm=m_{fuel\_ttl} \quad (7.1)$$

$$Qfs=0 \quad (7.2)$$

At S110, the controller 51 determines whether the warming up of the fuel cell stack 1 finishes or not. Specifically the controller 51 determines whether the stack temperature $T_{stk}$ reaches a predetermined temperature $T_{wup}$ or not, the temperature $T_{up}$ being for determination of warming-up finishing. When the stack temperature $T_{stk}$ reaches the predetermined temperature $T_{wup}$, the controller 51 determines that the warming up of the fuel cell stack 1 finishes, and ends the startup control to shift to the normal control. During normal, the controller 51 operates the fuel cell stack 1 at the rated output. When the stack temperature $T_{stk}$ does not reach the predetermined temperature $T_{wup}$, the procedure returns to S102. Then the controller 51 controls to operate the air compressor 61 continuously and repeatedly execute the processing of S102 to S110.

In the present embodiment, the controller 51, the first fuel injector 52 and the second fuel injector 53 make up a "control unit" of the fuel cell system S. The processing at S102 of FIG. 3 (reading the stack temperature $T_{stk}$) implements the function of a "temperature detection unit". The processing at S103 and S104 implements the function of a "warming-up target flow rate setting unit". The processing at S105 to S109 implements the function of a "fuel supplying control unit". The raw-fuel total flow rate $m_{fuel\_ttl}$ corresponds to a "warming-up target flow rate" of the present embodiment, and the stack temperature $T_{stk}$ corresponds to an "exit temperature of fuel cell" of the present embodiment.

The processing at S102 of FIG. 3 (reading the air flow rate $m_{air}$) implements the function of an "oxidant-gas flow rate detection unit". The processing at S103 implements the function of a "target combustion-gas temperature setting unit". The air flow rate $m_{air}$ corresponds to an "oxidant-gas flow rate" of the present embodiment, and the target combustor temperature $T_{cmb\_trg}$ corresponds to a "target combustion-gas temperature" of the present embodiment.

The present embodiment is configured so that the controller 51 determines whether the reformer 23 is ready for reforming of the raw fuel or not. To this end, when the reformer temperature $T_{ref}$ is the reformer lower-limit temperature $T_{ref\_min}$ or higher, the controller 51 determines that the reformer is ready for reforming of the raw fuel, and allows the supplying of the raw fuel to the reformer 23 via the first fuel injector 52. While the reformer temperature $T_{ref}$ is less than the reformer lower-limit temperature $T_{ref\_min}$, the controller 51 stops the supplying of the raw fuel to the reformer 23 and supplies the raw fuel to the combustor 41 via the second fuel injector 53.

In another embodiment, the controller 51 may determine whether the evaporator 21 is ready for evaporation of the raw fuel or not, in addition to or instead of the determination on the reformer 23. In one example, the system includes the evaporator 21 in the fuel treating unit 2 and performs conversion into hydrogen used for power generation by internal reforming of the fuel cell. In this case, the controller 51 may determine whether the evaporator temperature $T_{vap}$ is a lower-limit temperature (hereinafter called an "evaporator lower-limit temperature") $T_{vap\_min}$ or higher or not. At the lower-limit temperature, the evaporator 21 is ready for evaporation. When the evaporator temperature $T_{vap}$ is the evaporator lower-limit temperature $T_{vap\_min}$ or higher, the controller 51 allows the supplying of the raw fuel to the evaporator 21 via the first fuel injector 52. While the evaporator temperature $T_{ref}$ is less than the evaporator lower-limit temperature $T_{vap\_min}$, the controller 51 stops the supplying of the raw fuel to the evaporator 21 and supplies the raw fuel to the combustor 41 via the second fuel injector 53. In this case, the raw-fuel gas generated from evaporation (e.g., mixture gas of ethanol gas and water vapor) is the "fuel gas" generated at the fuel treating unit 2.

The present embodiment is configured to connect the combustor 41 with the cathode off-gas flow path 12exh of the fuel cell stack 1 so as to supply oxidant for catalyst combustion to the combustor 41.

In another embodiment, the combustor 41 may connect to the cathode-gas flow path 12 so as to directly supply oxidant gas to the combustor 41 from the air compressor 61 not via the fuel cell stack 1. Means for supplying oxidant to the combustor 41 may be disposed separately from the cathode-gas supplying/discharging system.

(Operation of Fuel Cell System)

Figure 4:
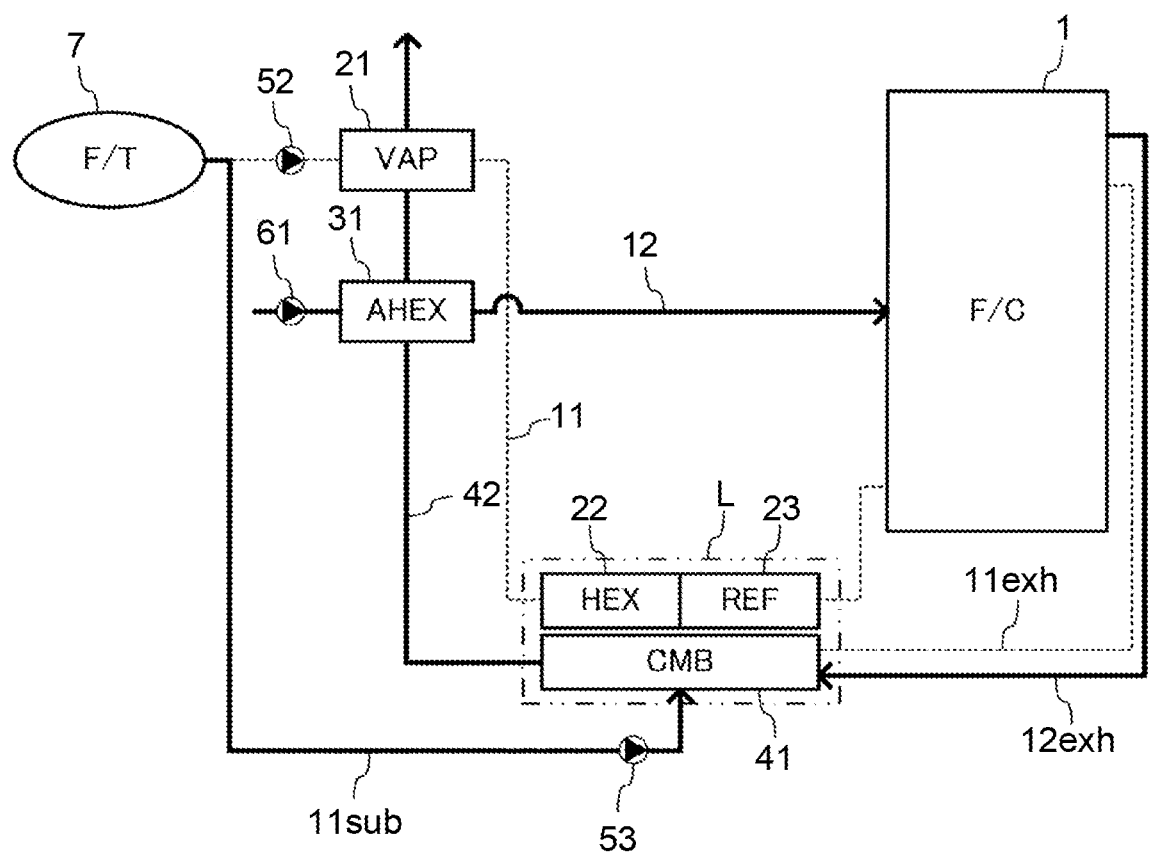
FIG. 4 describes the operation of the startup control (PRD1).
Figure 5:
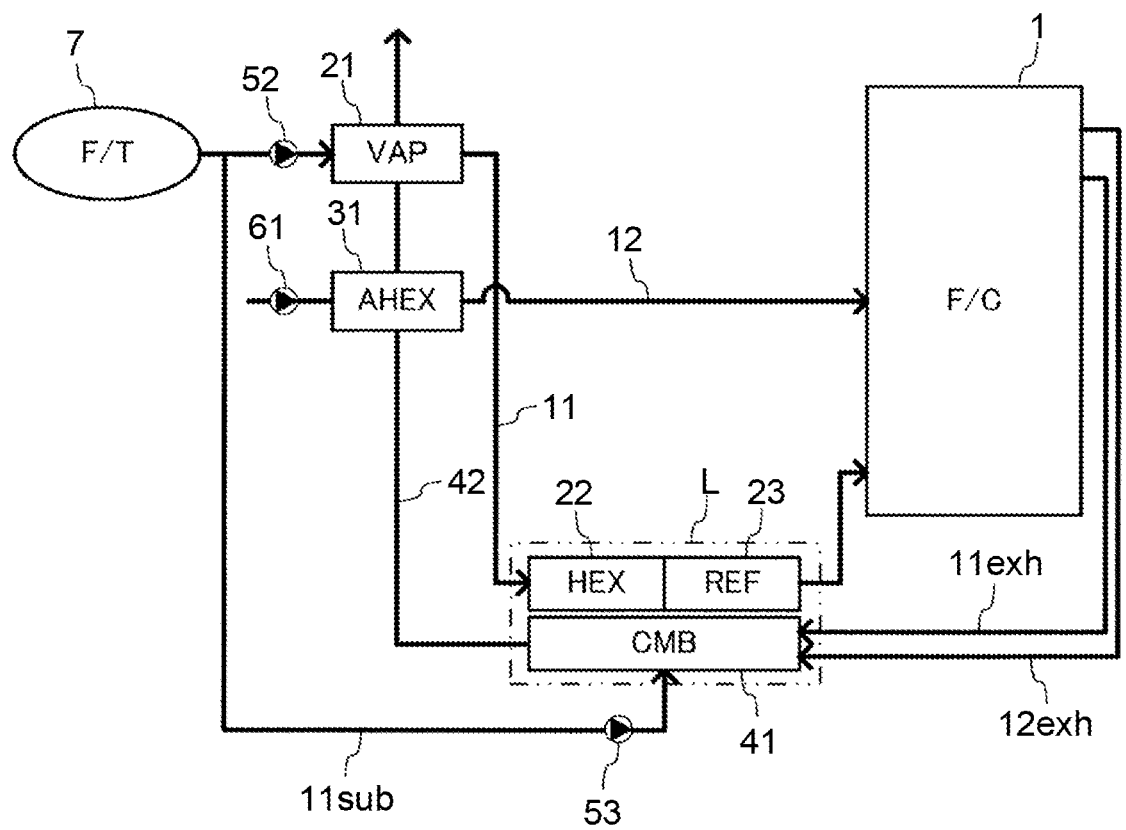
FIG. 5 describes the operation of the startup control (PRD2).
Figure 6:
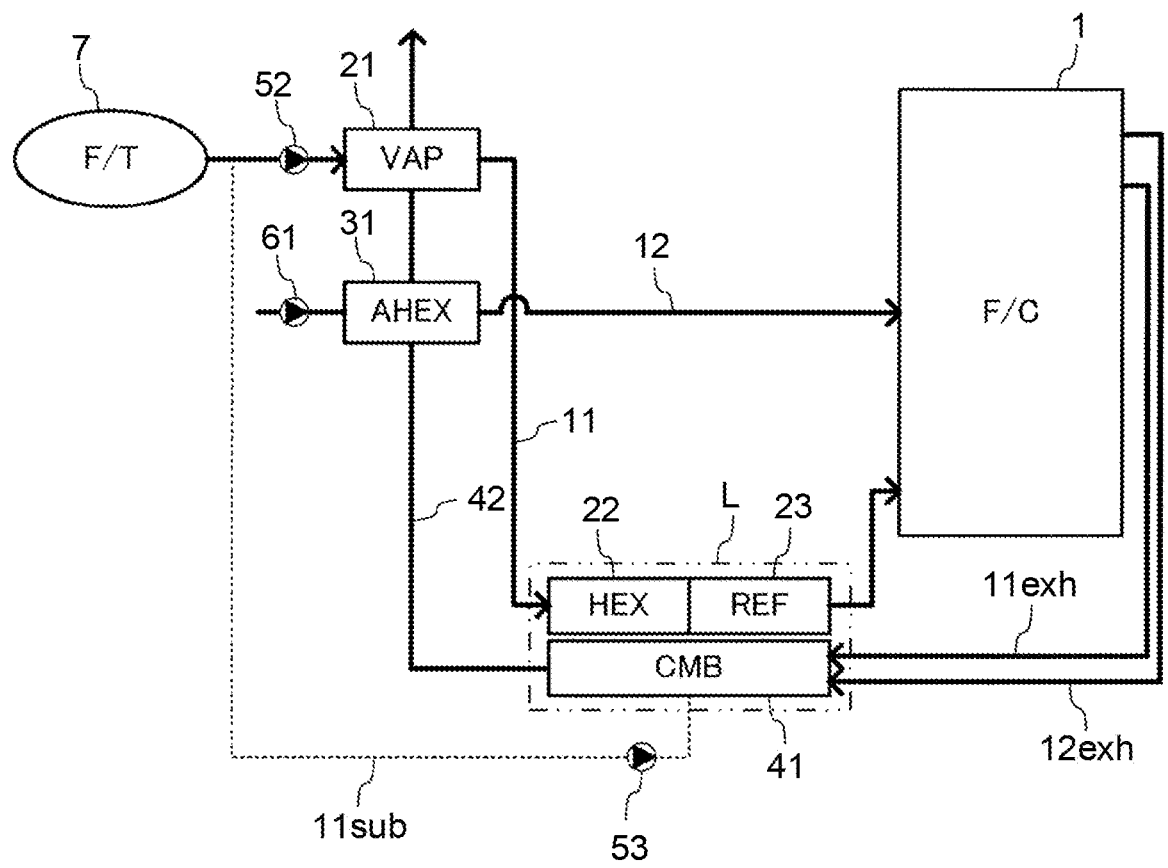
FIG. 6 describes the operation of the startup control (PRD3).

FIG. 4 to FIG. 6 show the operation of the fuel cell system S at the time of startup.

FIG. 4 shows the operation when the reformer temperature $T_{ref}$ is less than the reformer lower-limit temperature $T_{ref\_min}$. FIG. 5 and FIG. 6 show the operation when the reformer temperature $T_{ref}$ is the reformer lower-limit temperature $T_{ref\_min}$ or higher. FIG. 5 shows the case where the raw-fuel total flow rate $m_{fuel\_ttl}$ is more than the rated flow rate $m_{rtd}$, and FIG. 6 shows the case where the raw-fuel total flow rate $m_{fuel\_ttl}$ is the rated flow rate $m_{rtd}$ or less. FIG. 4 to FIG. 6 show the flow path where the gas is flowing with thick solid lines and the flow path where the flowing of the gas is stopping with the thin dotted lines.

Figure 7:
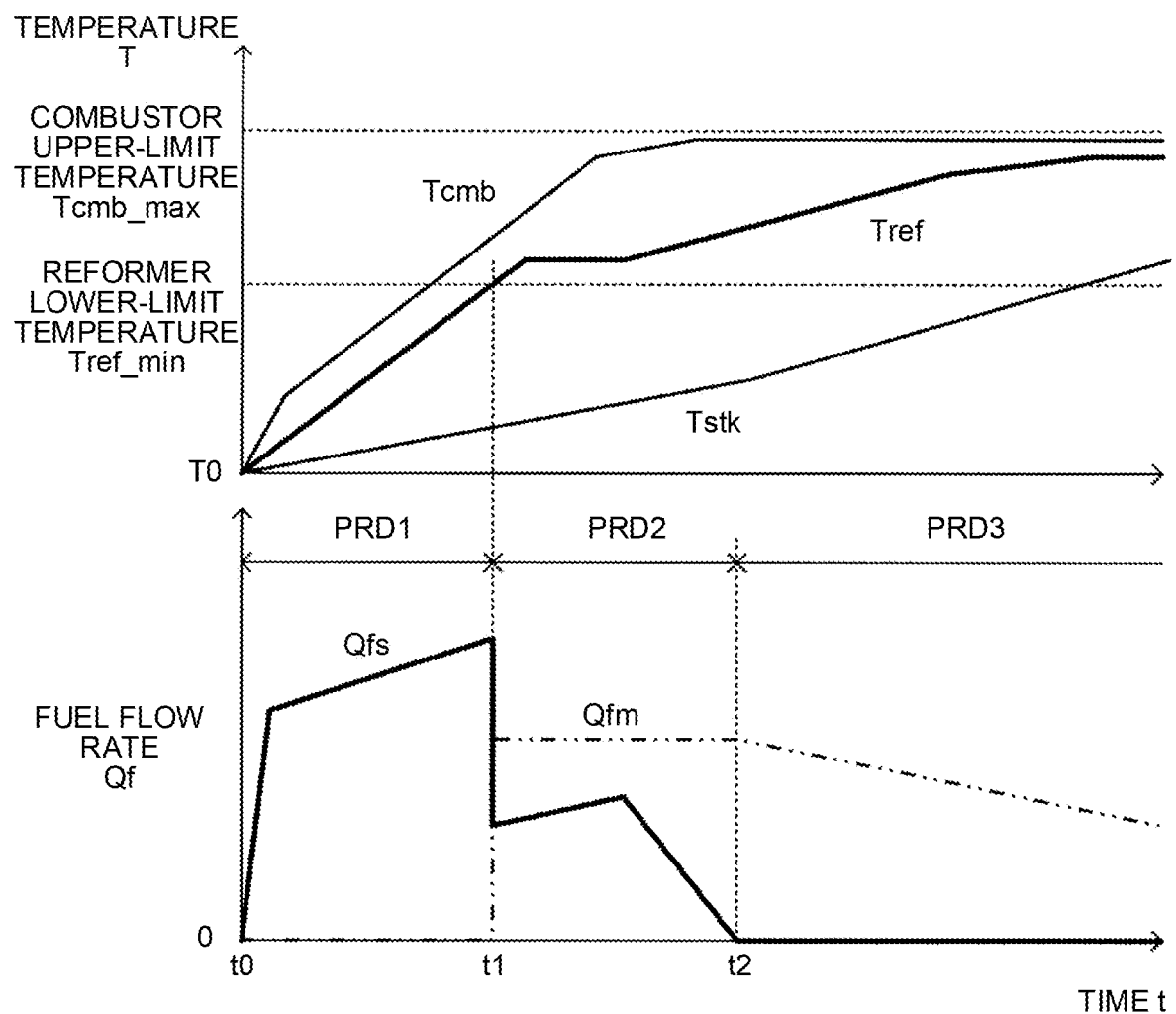
FIG. 7 is a time chart showing changes in the combustor temperature $T_{cmb}$, the reformer temperature $T_{ref}$, the stack temperature $T_{stk}$, and the fuel flow rate $m_{fuel}$ during the startup control.

FIG. 7 shows changes in the combustor temperature $T_{cmb}$, the reformer temperature $T_{ref}$, the stack temperature $T_{stk}$, and the fuel flow rate Qf at the time of startup of the fuel cell system S. The fuel flow rate Qfm is the flow rate of raw fuel supplied via the first fuel injector 52, and the fuel flow rate Qfs is the flow rate of raw fuel supplied via the second fuel injector 53. In FIG. 7, PRD1 represents the duration where the reformer temperature $T_{ref}$ is less than the reformer lower-limit temperature $T_{ref\_min}$, and PRD2 and PRD3 show the duration where the reformer temperature $T_{ref}$ is the reformer lower-limit temperature $T_{ref\_min}$ or more. Then PRD2 represents the duration where the raw-fuel total flow rate $m_{fuel\_ttl}$ (=Qfm+Qfs) is more than the rated flow rate $m_{rtd}$, and PRD3 represents the duration where the raw-fuel total flow rate $m_{fuel\_ttl}$ is the rated flow rate $m_{rtd}$ or less. The time chart at the lower part of FIG. 7 shows the raw-fuel injection amount Qfm of the first fuel injector 52 with the dashed-two dotted line, and the raw-fuel injection amount Qfs of the second fuel injector 53 with the solid line.

Referring to FIG. 7 as needed, the following describes the startup control of the present embodiment.

After starting of the startup control, at the duration PRD1 where the reformer temperature $T_{ref}$ is less than the reformer lower-limit temperature $T_{ref\_min}$, supplying of raw fuel via the first fuel injector 52 stops, and the raw fuel required for warming-up of the fuel cell stack 1 is supplied to the combustor 41 via the second fuel injector 53 (FIG. 4). The amount of heat generated from combustion of the raw fuel heats the fuel heat exchanger 22 and the reformer 23, and the combustion gas is supplied to the air heat exchanger 31 and the evaporator 21 via the combustion-gas flow path 42. Air sucked into the cathode-gas flow path 12 by the air compressor 61 is heated by heat exchange with the combustion gas at the air heat exchanger 31, and then the heated air is supplied to the fuel cell stack 1 to heat the fuel cell stack 1. This progresses the warming-up of the fuel cell stack 1 to increase the stack temperature $T_{stk}$ (FIG. 7).

When the reformer temperature $T_{ref}$ reaches the reformer lower-limit temperature $T_{ref\_min}$ (time t1), supplying of raw fuel via the first fuel injector 52 starts (FIG. 5). In the duration PRD2 where the raw-fuel total flow rate $m_{fuel\_ttl}$ in accordance with the stack temperature $T_{stk}$ is more than the rated flow rate $m_{rtd}$ (FIG. 7), the raw fuel of the rated flow rate $m_{rtd}$ is supplied to the reformer 23 via the first fuel injector 52, and the raw fuel corresponding to the shortage of the rated flow rate $m_{rtd}$ relative to the raw-fuel total flow rate $m_{fuel\_ttl}$ (=$m_{fuel\_ttl}$-$m_{rtd}$) is supplied to the combustor 41 via the second fuel injector 53. With this configuration, while the fuel cell system operates the fuel cell stack 1 at the rated output and heats the fuel cell stack 1 with generated power, the fuel cell system supplies the combustion gas generated at the combustor 41 to the air heat exchanger 31 and supplies heated air by heat exchange with the combustion gas to the fuel cell stack 1 to promote warming-up of the fuel cell stack 1.

When the reformer temperature $T_{ref}$ increases more and the raw-fuel total flow rater $m_{fuel\_ttl}$ corresponding to the stack temperature $T_{stk}$ falls below the rated flow rate $m_{rtd}$ (time t2), supplying of the raw fuel via the second fuel injector 53 stops, and the raw fuel of the raw-fuel total flow rate $m_{fuel\_ttl}$ is supplied to the reformer 23 via the first fuel injector 52 (FIG. 7, duration PRD3). While this keeps the power generation at the fuel cell stack 1 and so heats the fuel cell stack 1, combustion of the fuel remaining in the anode off-gas at the combustor 41 enables supplying the amount of heat required for reforming to the reformer 23 and supplying of the combustion gas of the remaining gas to the air heat exchanger 31 and the evaporator 21 to keep the entire system at a temperature required for the operation. When an increase of the stack temperature $T_{stk}$ decreases the raw-fuel total flow rate $m_{fuel\_ttl}$, the raw-fuel injection amount Qfm of the first fuel injector 52 accordingly decreases. When the stack temperature $T_{stk}$ reaches the temperature $T_{wup}$ to determine that the warming-up finishes, the fuel cell system determines that the warming up of the fuel cell stack 1 finishes, and ends the startup control to shift to the normal control.

(Actions and Advantageous Effects)

The fuel cell system S according to the present embodiment has the above-stated configuration, and the following describes the actions and advantageous effects from the present embodiment.

Firstly at the time of startup of the fuel cell system S, the fuel cell system S determines whether the fuel treating unit 2 is ready for the treatment of raw fuel or not. Specifically the fuel cell system S determines whether the reformer 23 is at a temperature enabling the reforming or not (at the temperature of the reformer lower-limit temperature $T_{ref\_min}$ or higher). When the reformer 23 is at the reformable temperature, the fuel cell system S supplies raw fuel to both of the reformer 23 and the combustor 41. With this configuration, at the time of startup, the fuel cell system S supplies the fuel gas generated from reforming of the raw fuel to the fuel cell stack 1 to generate power at the fuel cell stack 1, and promotes the warming-up of the fuel cell stack 1 with the power generation. In addition, the fuel cell system S supplies combustion gas generated at the combustor 41 to the air heat exchanger 31, and heats oxidant gas at the air heat exchanger 31 so as to heat the fuel cell stack 1 with the amount of heat that the oxidant gas has. In this way, the present embodiment enables quick heating of the fuel cell stack 1 and so promotes the warming-up of the fuel cell stack 1, and quickly starts up the fuel cell system S.

The present embodiment is configured to divide the flow rate (raw-fuel total flow rate $m_{fuel\_ttl}$) required for warming-up of the fuel cell stack 1 between the reformer 23 and the combustor 41. This does not need any special design for startup and so enables an efficient system. The present embodiment is configured to collect the amount of heat generated from the combustion of raw fuel at the reformer 23 and the air heat exchange 31. In this way the present embodiment enables effective operation of the entire system and suppresses the consumption of raw fuel.

The present embodiment is configured to supply raw fuel at the flow rate (rated flow rate $m_{rtd}$) required for the rated operation of the fuel cell stack 1 to the reformer 23, and supply the raw fuel corresponding to the shortage of the rated flow rate $m_{rtd}$ relative to the raw-fuel total flow rate $m_{fuel\_ttl}$ to the combustor 41. This actively collects the amount of heat generated from the combustion of raw fuel while promoting warming-up due to power generation, and so improves the efficiency of the entire system.

Secondly the present embodiment detects the temperature of fuel cells, specifically the temperature close to the outlet of the cathode-off gas of the fuel cell stack 1, and sets the target flow rate (raw-fuel total flow rate $m_{fuel\_ttl}$) of the raw fuel during the warming-up of the fuel cell stack 1 based on the temperature. This supplies raw fuel at an appropriate flow rate for warming-up of the fuel cell stack 1 to promote the warming-up while suppressing the consumption of raw fuel. To calculate the raw-fuel total flow rate $m_{fuel\_ttl}$, the present embodiment detects the temperature close to the outlet of the cathode-off gas (stack temperature $T_{stk}$) to correctly understand the state of the fuel cell stack 1 in the course of warming-up.

The present embodiment sets the target temperature (target combustor temperature $T_{cmb\_trg}$) of the combustion gas generated at the combustor 41, and sets the raw-fuel total flow rate $m_{fuel\_ttl}$ based on the flow rate (air flow rate $m_{air}$) of oxidant gas supplied to the fuel cell stack 1, the stack temperature $T_{stk}$, and the target combustor temperature $T_{cmb\_trg}$. In this way the present embodiment provides specific means to set the raw-fuel total flow rate $m_{fuel\_ttl}$. The present embodiment sets the target combustor temperature $T_{cmb\_trg}$ based on the stack temperature $T_{stk}$, and so reduces the calculation burden of the controller 51 to set the target combustor temperature $T_{cmb\_trg}$.

Thirdly the present embodiment connects the combustor 41 to the off-gas flow paths (the anode off-gas flow path 11exh and the cathode off-gas flow path 12exh) of the fuel cell stack 1. This does not need any special means to supply oxidant for catalyst combustion to the combustor 41, and so simplifies the configuration of the fuel cell system S. The present embodiment is configured so that the combustor 4 combusts the fuel remaining in anode off-gas, and supplies the amount of heat required for reforming to the reformer 23.

Fourthly when the fuel treating unit 2 in the fuel cell system S is not ready for the treatment of raw fuel, specifically when the reformer 23 is not at the reformable temperature, the present embodiment supplies raw fuel only to the combustor 41 between the reformer 23 and the combustor 41. This warms up the fuel cell stack 1 by heating of the oxidant gas, and heats the fuel treating unit 2 (reformer 23) with the combustion gas to let the fuel treating unit 2 (reformer 23) be ready for the treatment of raw fuel speedily.

The above embodiment of the present invention is merely a part of examples of the application of the present invention, and the technical scope of the present invention is not limited to the specific constitutions of the above embodiment. The above embodiment may be variously changed or modified within the scope specified in the claims.

The invention claimed is:

1. A fuel cell system comprising:
a fuel cell;
a fuel treating unit configured to treat raw fuel and generate fuel gas for the fuel cell;
an oxidant-gas heater configured to heat oxidant gas for the fuel cell;
a combustor configured to combust the raw fuel and generate combustion gas to heat the fuel treating unit and the oxidant-gas heater;
a first fuel injector configured to adjust a flow rate of the raw fuel supplied to the fuel treating unit;
a second fuel injector configured to adjust a flow rate of the raw fuel supplied to the combustor; and
a control unit configured to control the first fuel injector and the second fuel injector, wherein the control unit is configured to:
execute warming-up of the fuel cell by controlling the first fuel injector and the second fuel injector, and
execute rated operation of the fuel cell wherein rated operation is a power generation of the fuel cell for supplying power to an external device executed by activating the first fuel injector and stopping the second fuel injector after warming-up of the fuel cell;
wherein the control unit is configured to:
set a raw-fuel total flow rate of the flow rate of the raw fuel for the first fuel injector and the flow rate of the raw fuel for the second fuel injector during warming-up of the fuel cell such that the raw-fuel total flow rate is greater than the flow rate of the raw fuel in the first fuel injector during rated operation,
set the flow rate of the raw fuel for the second fuel injector to the raw-fuel total flow rate while the first fuel injector is set to be stopped before the fuel treating unit reaches an operable temperature of the fuel treating unit, and
set the flow rate of the raw fuel for the first fuel injector and the flow rate of the raw fuel for the second fuel injector such that the sum of the flow rate of the raw fuel for the first fuel injector and the flow rate of the raw fuel for the second fuel injector is set to be the raw-fuel total flow rate when the fuel treating unit reaches the operable temperature of the fuel treating unit.

2. The fuel cell system according to claim 1, wherein when a temperature of the fuel treating unit is less than the operable temperature, the control unit supplies the raw fuel only to the combustor between the fuel treating unit and the combustor.

3. The fuel cell system according to claim 1, wherein
the fuel treating unit includes a reformer configured to reform the raw fuel into the fuel gas, and
when a temperature of the reformer is at a temperature enabling reforming of the raw fuel, the control unit supplies the raw fuel to both of the fuel treating unit and the combustor.

4. The fuel cell system according to claim 3, wherein
the control unit detects, as a temperature of the reformer, a temperature of the fuel gas downstream of the reformer.

5. The fuel cell system according to claim 1, wherein
the fuel treating unit includes an evaporator configured to evaporate the raw fuel in the form of liquid, and
when a temperature of the evaporator is at a temperature enabling evaporation of the raw fuel, the control unit supplies the raw fuel to both of the fuel treating unit and the combustor.

6. The fuel cell system according to claim 1, wherein
the fuel treating unit includes an evaporator configured to evaporate the raw fuel in the form of liquid, and
when a temperature of the combustion gas downstream of the evaporator is at a temperature enabling evaporation of the raw fuel, the control unit supplies the raw fuel to both of the fuel treating unit and the combustor.

* * * * *